(12) United States Patent
Kito

(10) Patent No.: US 9,632,398 B2
(45) Date of Patent: Apr. 25, 2017

(54) DISCHARGE LAMP DRIVING DEVICE, PROJECTOR, AND DISCHARGE LAMP DRIVING METHOD

(71) Applicant: SEIKO EPSON CORPORATION, Tokyo (JP)

(72) Inventor: Satoshi Kito, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 218 days.

(21) Appl. No.: 14/543,148

(22) Filed: Nov. 17, 2014

(65) Prior Publication Data

US 2015/0156853 A1   Jun. 4, 2015

(30) Foreign Application Priority Data

Dec. 4, 2013   (JP) ................................. 2013-250841

(51) Int. Cl.
  *H05B 37/02* (2006.01)
  *G03B 21/00* (2006.01)
  *G03B 21/20* (2006.01)
  *H05B 41/292* (2006.01)

(52) U.S. Cl.
  CPC ....... *G03B 21/006* (2013.01); *G03B 21/2053* (2013.01); *H05B 41/2928* (2013.01); *G03B 21/2026* (2013.01); *Y02B 20/208* (2013.01)

(58) Field of Classification Search
  CPC ......... H05B 41/14; H05B 41/16; H05B 41/24
  USPC ............ 315/224–226, 283, 291, 308; 353/85
  See application file for complete search history.

(56) References Cited

U.S. PATENT DOCUMENTS

| 5,063,490 | A | * | 11/1991 | Maehara | H05B 41/392 315/105 |
| 8,400,074 | B2 | * | 3/2013 | Hasegawa | H05B 41/2988 315/209 R |
| 8,581,506 | B2 | | 11/2013 | Yamauchi et al. | |
| 2004/0130273 | A1 | * | 7/2004 | Alexandrov | H02M 1/38 315/291 |
| 2008/0143269 | A1 | * | 6/2008 | Lee | H05B 41/3925 315/219 |

(Continued)

FOREIGN PATENT DOCUMENTS

| JP | A-7-85982 | 3/1995 |
| JP | A-2003-243194 | 8/2003 |

(Continued)

OTHER PUBLICATIONS

Ye, Xu., "Research on Novel Electronic Ballast for HID," Electric and Automation Engineering Collage of Tianjin University, pp. 1-73, Jun. 2009.

*Primary Examiner* — Thuy Vinh Tran
(74) *Attorney, Agent, or Firm* — Oliff PLC

(57) ABSTRACT

A discharge lamp driving device includes a discharge lamp driving section configured to supply a driving current to a discharge lamp, the driving current being an alternating current for driving the discharge lamp, and a control section configured to control the discharge lamp driving section. The control section controls the discharge lamp driving section such that the driving current having a driving frequency different from a natural frequency of the discharge lamp and a frequency of 1/2n (n is a natural number) times the natural frequency is supplied to the discharge lamp.

7 Claims, 9 Drawing Sheets

(56) References Cited

U.S. PATENT DOCUMENTS

| | | | |
|---|---|---|---|
| 2010/0072906 A1* | 3/2010 | Kuang | ............... H05B 41/3925 315/209 R |
| 2010/0084987 A1 | 4/2010 | Yamauchi et al. | |
| 2010/0195062 A1* | 8/2010 | Ueda | .................. G03B 21/2026 353/84 |

FOREIGN PATENT DOCUMENTS

| | | | | |
|---|---|---|---|---|
| JP | A-2007-115534 | 5/2007 | | |
| JP | A-2008-84782 | 4/2008 | | |
| JP | B2-4103439 | 6/2008 | | |
| JP | A-2010-114064 | 5/2010 | | |
| JP | 2011044258 A | * | 3/2011 | ............. H05B 41/24 |

* cited by examiner

DISCHARGE LAMP DRIVING DEVICE, PROJECTOR, AND DISCHARGE LAMP DRIVING METHOD

BACKGROUND

1. Technical Field

The present invention relates to a discharge lamp driving device, a light source device, a projector, and a discharge lamp driving method.

2. Related Art

It is known that an acoustic resonance phenomenon occurs when a natural frequency of a lamp and a frequency of a driving current supplied to the lamp coincide with each other. When the acoustic resonance phenomenon occurs, a light emission amount of the lamp changes and flickering of the lamp occurs. Further, breakage of the lamp such as bending of an electrode of the lamp occurs.

As measures against the problems, there has been proposed a configuration for changing the frequency of the driving current according to a ripple voltage and suppressing the natural frequency of the lamp and the frequency of the driving current from coinciding with each other (e.g., JP-A-07-085982 (Patent Literature 1)).

However, suppression of the acoustic resonance phenomenon by the configuration explained above is insufficient. That is, simply by suppressing the natural frequency of the lamp and the frequency of the driving current from coinciding with each other, the acoustic resonance phenomenon cannot be sufficiently suppressed. Flickering of the lamp, breakage of the lamp, and the like sometimes occur.

SUMMARY

An advantage of some aspects of the invention is to provide a discharge lamp driving device that can sufficiently suppress the acoustic resonance phenomenon, a light source device including the discharge lamp driving device, a projector including the light source device, and a discharge lamp driving method that can sufficiently suppress the acoustic resonance phenomenon.

An aspect of the invention is directed to a discharge lamp driving device including: a discharge lamp driving section configured to supply a driving current to a discharge lamp the driving current being an alternating current for driving the discharge lamp; and a control section configured to control the discharge lamp driving section. The control section controls the discharge lamp driving section such that the driving current having a driving frequency different from a natural frequency of the discharge lamp and a frequency of 1/2n (n is a natural number) times the natural frequency is supplied to the discharge lamp.

In the discharge lamp driving device according to the aspect of the invention, the driving current having the driving frequency different from the natural frequency of the discharge lamp and the frequency of 1/2n times the natural frequency is supplied to the discharge lamp. The acoustic resonance phenomenon occurs not only when the frequency of the alternating current supplied to the discharge lamp coincides with the natural frequency of the discharge lamp but also when the frequency of the alternating current coincides with the frequency of 1/2n times the natural frequency. Therefore, with the discharge lamp driving device according to the aspect of the invention, it is possible to obtain the discharge lamp driving device that can suppress the driving frequency of the driving current supplied to the discharge lamp from coinciding with the natural frequency of the discharge lamp and 1/2n times the natural frequency of the discharge lamp and can sufficiently suppress the acoustic resonance phenomenon.

The inventors have clarified anew the knowledge that the acoustic resonance phenomenon occurs not only when the frequency of the driving current coincides with the natural frequency of the discharge lamp bat also when the frequency of the driving current coincides with the frequency of 1/2n times the natural frequency.

When the natural frequency is represented as f1, the driving frequency is represented as f2, and a half value width of a discharge lamp voltage of the discharge lamp at the time when a value of the driving frequency is changed, in a predetermined range centering on the natural frequency f1 is represented as Δf, the control section may be configured to control the discharge lamp driving section such that the driving frequency f2 satisfies any one of the following Expressions 1 to 3.

$$f2 > f1 + \Delta f/2 \quad \text{Expression 1}$$

$$(f1 + \Delta f/2)/2 < f2 < f1 - \Delta f/2 \quad \text{Expression 2}$$

$$(f1 + \Delta f/2)/2(n+1) < f2 < (f1 - \Delta f/2)/2n \ (n \text{ is a natural number}) \quad \text{Expression 3}$$

With this configuration, the driving frequency is set not to coincide with a frequency in the vicinity of the natural frequency of the discharge lamp and the frequency of 1/2n times the natural frequency of the discharge lamp. Therefore, it is possible to more effectively suppress the acoustic resonance phenomenon.

A waveform of the driving current may be configured to be a rectangular wave. With this configuration, it is possible to efficiently supply the driving current.

The driving frequency nay be configured to be equal to or higher than 1 kHz. With this configuration, it is possible to suppress blackening and devitrification of the discharge lamp.

Another aspect of the invention is directed to a light source device including: a discharge lamp configured to emit light; and the discharge lamp driving device according to the aspect of the invention described above.

According to the aspect of the invention, since the light source device includes the discharge lamp driving device, it is possible to obtain the light source device that can sufficiently suppress the acoustic resonance phenomenon.

Still another aspect of the invention is directed to a projector including: the light source device according to the aspect of the invention described above; a light modulation element configured to modulate light emitted from the light source device according to a video signal; and a projection optical system configured to project light modulated by the light modulation element.

According to the aspect of the invention, since the projector includes the light source device, it is possible to obtain the projector that can sufficiently suppress the acoustic resonance phenomenon.

Yet another aspect of the invention is directed to a discharge lamp driving method for supplying a driving current, which is an alternating current, to a discharge lamp and driving the discharge lamp including: the driving current having a driving frequency different from a natural frequency of the discharge lamp and a frequency of 1/2n (n is a natural number) times the natural frequency to the discharge lamp.

According to the aspect of the invention, it is possible to sufficiently suppress the acoustic resonance phenomenon as explained above.

When the natural frequency is represented as f1, the driving frequency is represented as f2, and a half value width of a discharge lamp voltage of the discharge lamp at the time when a value of the driving frequency is changed in a predetermined range centering on the natural frequency f1 is represented as Δf, the discharge lamp driving method may include setting the driving frequency f2 to satisfy any one of the following Expressions 1 to 3.

$$f2 > f1 + \Delta f/2 \qquad \text{Expression 1}$$

$$(f1+\Delta f/2)/2 < f2 < f1-\Delta f/2 \qquad \text{Expression 2}$$

$$(f1+\Delta f/2)/2(n+1) < f2 < (f1-\Delta f/2)/2n \text{ (}n\text{ is a natural number)} \qquad \text{Expression 3}$$

With this method, it is possible to more effectively suppress the acoustic resonance phenomenon as explained above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
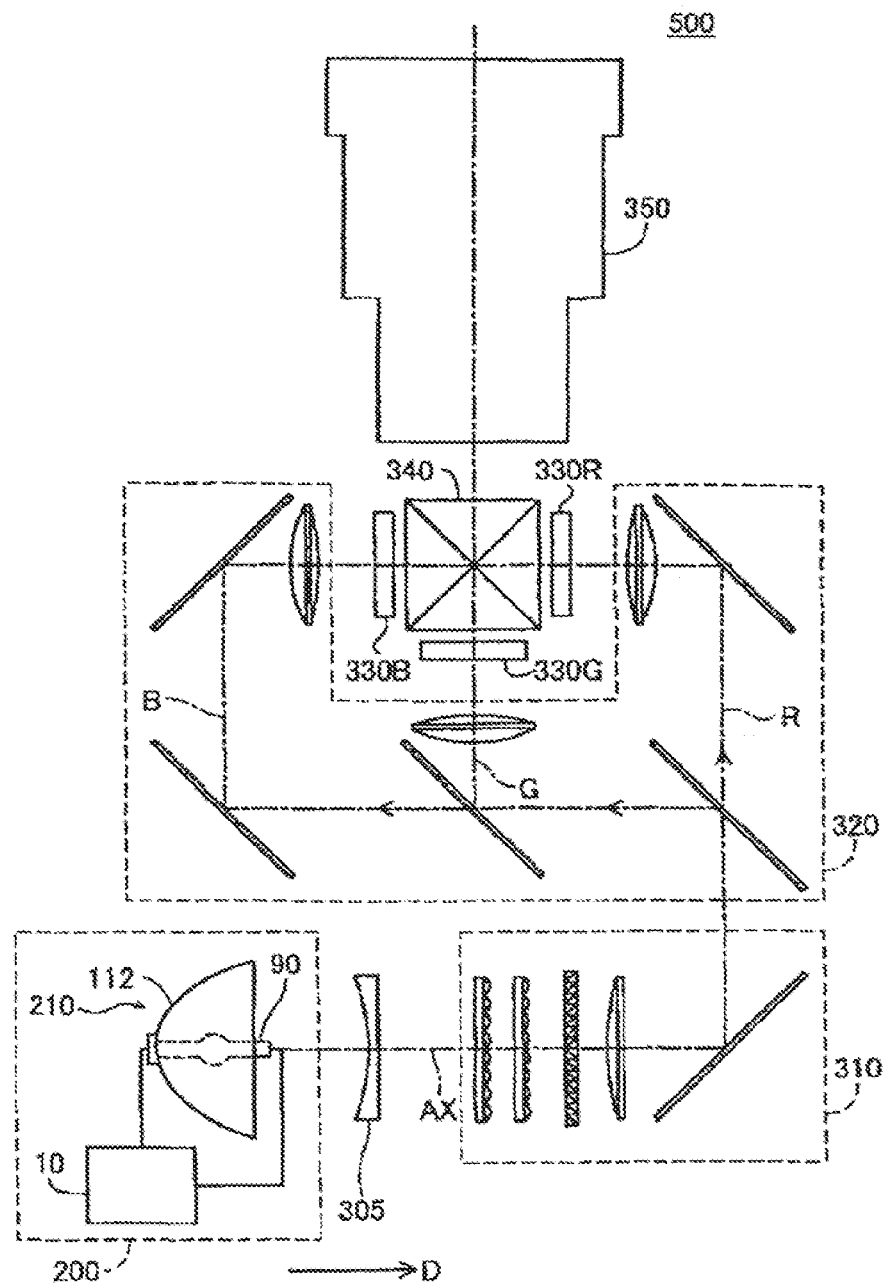
FIG. 1 is a schematic diagram of a projector in an embodiment.

A projector according to an embodiment of the invention is explained below with reference to the drawings.

Note that a scope of the invention is not limited to the embodiment explained below and can be arbitrarily changed within the scope of the technical idea of the invention. In the drawings referred to below, to clearly show components, scales, numbers, and the like of the components are sometimes shown to be different from actual scales, numbers, and the like.

As shown in FIG. 1, a projector 500 in this embodiment includes a light source device 200, a collimating lens 305, an illumination optical system 310, a color separation optical system 320, three liquid crystal light valves (light modulation elements) 330R, 330G, and 330B, a cross dichroic prism 340, and a projection optical system 350.

Light emitted from the light source device 200 is made incident on the illumination optical system 310 passing through the collimating lens 305. The collimating lens 305 has a function of collimating the light emitted from the light source device 200.

The illumination optical system 310 has a function of adjusting the illuminance of the light emitted from the light source device 200 to be equalized on the liquid crystal light valves 330R, 330G, and 330B. The illumination optical system 310 also has a function of aligning a polarization direction of the light emitted from the light source device 200 in one direction. This is for the purpose of effectively using the light emitted from the light source device 200 in the liquid crystal light valves 330R, 330G, and 330B.

The light, the illuminance distribution and the polarization direction of which are adjusted, is made incident on the color separation optical system 320. The color separation optical system 320 separates the incident light into three color lights, i.e., red light (R), green light (G), and blue light (B). The three color lights are respectively modulated by the liquid crystal light valves 330R, 330G, and 330B associated with the respective colors. The liquid crystal light valves 330R, 330G, and 330B include liquid crystal panels 560R, 560G, and 560B explained below and polarizing plates (not shown in the figure). The polarizing plates are arranged on light incident sides and light emission sides of the respective liquid crystal panels 560R, 560G, and 560B.

The modulated three color lights are combined by the cross dichroic prism 340. The combined light is made incident on the projection optical system 350. The projection optical system 350 projects the incident light on a screen 700 (see FIG. 3). Consequently, a video is displayed on the screen 700. Note that, as the configurations of the collimating lens 305, the illumination optical system 310, the color separation optical system 320, the cross dichroic prism 340, and the projection optical system 350, publicly-known various configurations can be adopted.

Figure 2:
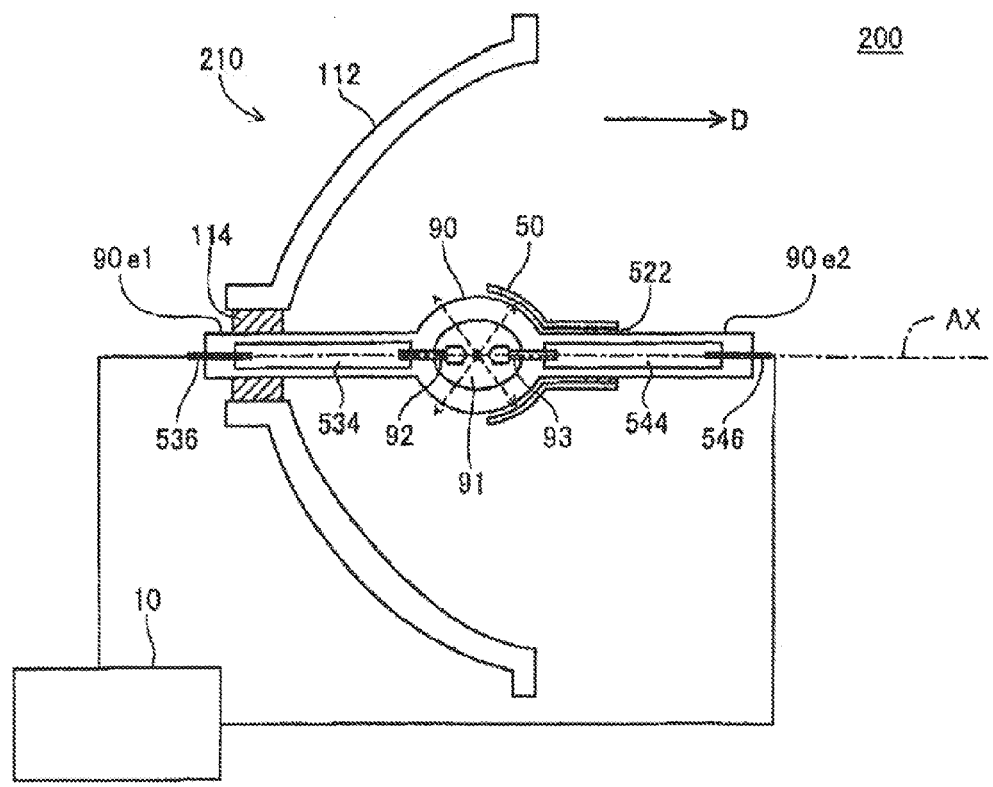
FIG. 2 is a diagram showing a discharge lamp in the embodiment.

FIG. 2 is a diagram showing the configuration of the light source device 200. The light source device 200 includes a light source unit 210 and a discharge lamp lighting device (a discharge lamp driving device) 10. In FIG. 2, a sectional view of the light source unit 210 is shown. The light source unit 210 includes a main reflecting mirror 112, a discharge lamp 90, and a sub-reflecting mirror 50.

The discharge lamp lighting device 10 supplies a driving current (driving power) to the discharge lamp 90 and lights the discharge lamp 90. The main reflecting mirror 112 reflects light emitted from the discharge lamp 90 to an irradiation direction D. The irradiation direction D is parallel to an optical axis AX of the discharge lamp 90.

The shape of the discharge lamp 90 is a bar shape extending along the irradiation direction D. One end section (an end section on the left side in the figure) of the discharge lamp 90 is represented as first end section 90e1. The other end section (an end section on the right side in the figure) of the discharge lamp 90 is represented as second end section 90e2. The material of the discharge lamp 90 is a transmissive material such as quartz glass. The center section of the discharge lamp 90 is swelled in a spherical shape. The inside of the center section of the discharge lamp 90 is a discharge space 91. In the discharge space 91, gas serving as a discharge medium including a rare gas and a metal halogen compound is encapsulated.

The distal ends of a first electrode 92 and a second electrode 93 project into the discharge space 91. The first electrode 92 is arranged on the first end section 90e1 side of the discharge space 91. The second electrode 93 is arranged on the second end section 90e2 side of the discharge space 91. The shape of the first electrode 92 and the second electrode 93 is a bar shape extending along the optical axis AX. In the discharge space 91, electrode distal end sections of the first electrode 92 and the second electrode 93 are arranged to be spaced a predetermined distance from and opposed to each other. The material of the first electrode 92 and the second electrode 93 is metal such as tungsten.

A first terminal 536 is provided in the first end section 90e1 of the discharge lamp 90. The first terminal 536 and the first electrode 92 are electrically connected by a conductive member 534 that pierces through the inside of the discharge lamp 90. Similarly, a second terminal 546 is provided in the second end section 90e2 of the discharge lamp 90. The second terminal 546 and the second electrode 93 are electrically connected by a conductive member 544 that pierces through the inside of the discharge lamp 90. The material of the first terminal 536 and the second terminal 546 is metal such as tungsten. As the material of the conductive members 534 and 544, for example, molybdenum foil is used.

The first terminal 536 and the second terminal 546 are connected to the discharge lamp lighting device 10. The discharge lamp lighting device 10 supplies a driving current for driving the discharge lamp 90 to the first terminal 536 and the second terminal 546. As a result, arc discharge occurs between the first electrode 92 and the second electrode 93. Light generated by the arc discharge (discharge light) is radiated in all directions from a discharge position as indicated by broken line arrows.

The main reflecting mirror 112 is fixed to the first end section 90e1 of the discharge lamp 90 by a fixing member 114. The main reflecting mirror 112 reflects, to the irradiation direction D, light traveling to the opposite side of the irradiation direction D in the discharge light. The shape of a reflection surface (a surface on the discharge lamp 90 side) of the main reflecting mirror 112 is not particularly limited as long as the reflection surface can reflect the discharge light to the irradiation direction D. The shape may be, for example, a spheroidal shape or a paraboloidal shape. For example, when the shape of the reflection surface of the main reflecting mirror 112 is the paraboloidal shape, the main reflecting mirror 112 can convert the discharge light into light substantially parallel to the optical axis AX. Consequently, the collimating lens 305 can be omitted.

The sub-reflecting mirror 50 is fixed to the second end section 90e2 side of the discharge lamp 90 by a fixing member 522. The shape of a reflection surface (a surface on the discharge lamp 90 side) of the sub-reflecting mirror 50 is a spherical shape that surrounds a portion on the second end section 90e2 side of the discharge space 91. The sub-reflecting mirror 50 reflects, to the main reflecting mirror 112, light traveling to the opposite side of an arranged side of the main reflecting mirror 112 in the discharge light. Consequently, it is possible to improve efficiency of use of the light radiated from the discharge space 91.

The material of the fixing members 114 and 522 is not particularly limited as long as the material is a heat resistant material that can withstand heat generation from the discharge lamp 90. For example, the material is an inorganic adhesive. A method of fixing the arrangement of the main reflecting mirror 112 and the sub-reflecting mirror 50 and the discharge lamp 90 is not limited to a method of fixing the main reflecting mirror 112 and the sub-reflecting mirror 50 to the discharge lamp 90. Any method can be adopted. For example, the discharge lamp 90 and the main reflecting mirror 112 may be independently fixed to a housing (not shown in the figure) of the projector 500. The same applies to the sub-reflecting mirror 50.

A circuit configuration of the projector 500 is explained below.

Figure 3:
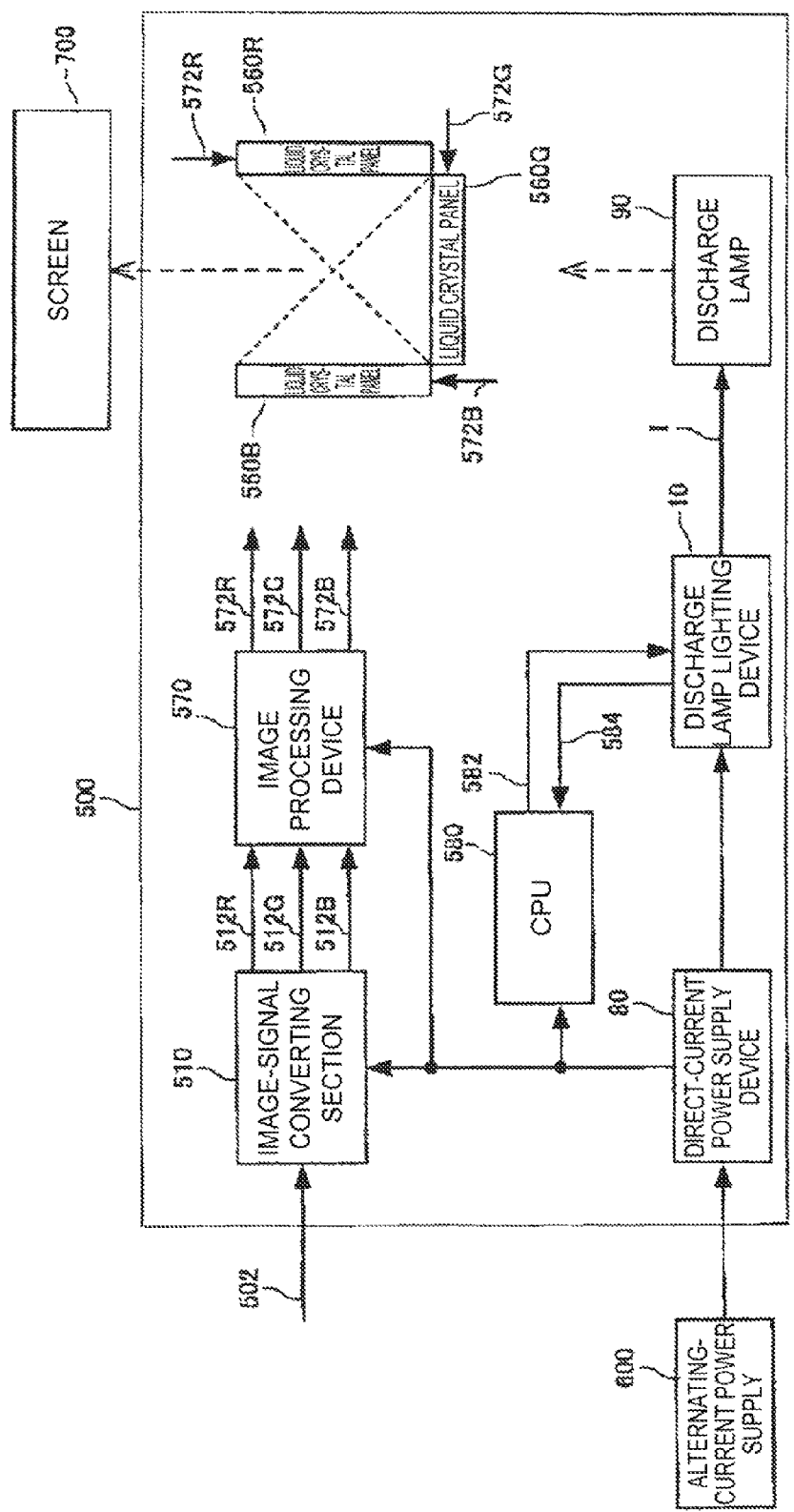
FIG. 3 is a block diagram showing various constituent elements of the projector in the embodiment.

FIG. 3 is a diagram showing an example of the circuit configuration of the projector 500 in this embodiment. The projector 500 includes, besides the optical system, shown in FIG. 1, an image-signal converting section 510, a direct-current power supply device 80, the liquid crystal panels 560R, 560G, and 560B, an image processing device 570, and a CPU (Central Processing Unit) 580.

The image-signal converting section 510 converts an image signal 502 (a luminance-color difference signal, an analog RGB signal, etc.) input from the outside into a digital RGB signal having a predetermined word length, generates image signals 512R, 512G, and 512B, and supplies the image signals 512R, 512G, and 512B to the image processing device 570.

The image processing device 570 applies image processing respectively to the three image signals 512R, 512G, and 512B. The image processing device 570 supplies driving signals 572R, 572G, and 572B for respectively driving the liquid crystal panels 560R, 560G, and 560B to the liquid crystal panels 560R, 560G, and 560B.

The direct-current power supply device 80 converts an alternating-current voltage supplied from an external alternating-current power supply 600 into a fixed direct-current voltage. The direct-current power supply device 80 supplies the direct-current voltage to the image-signal converting section 510 and the image processing device 570 present on a secondary side of a transformer (not shown in the figure; included in the direct-current power supply device 80) and the discharge lamp lighting device 10 present on a primary side of the transformer.

The discharge lamp lighting device 10 generates a high voltage between the electrodes of the discharge lamp 90 during startup, causes dielectric breakdown, and forms a discharge path. Thereafter, the discharge lamp lighting device 10 supplies a driving current I for the discharge lamp 90 to maintain electric discharge.

The liquid crystal panels 560R, 560G, and 560S are respectively included in the liquid crystal light valves 330R, 330G, and 330B. The liquid crystal panels 560R, 560G, and 560B respectively modulate, on the basis of the driving signals 572R, 572G, and 572B, the transmittances (luminances) of the color lights made incident on the liquid crystal panels 560B, 560G, and 560B via the optical system.

The CPU 580 controls various operations from a lighting start to extinction of the projector 500. For example, in the example shown in FIG. 3, the CPU 580 outputs a lighting command and an extinction command to the discharge lamp lighting device 10 via a communication signal 582. The CPU 580 receives lighting information of the discharge lamp 90 from the discharge lamp lighting device 10 via a communication signal 584.

The configuration of the discharge lamp lighting device 10 is explained, below.

Figure 4:
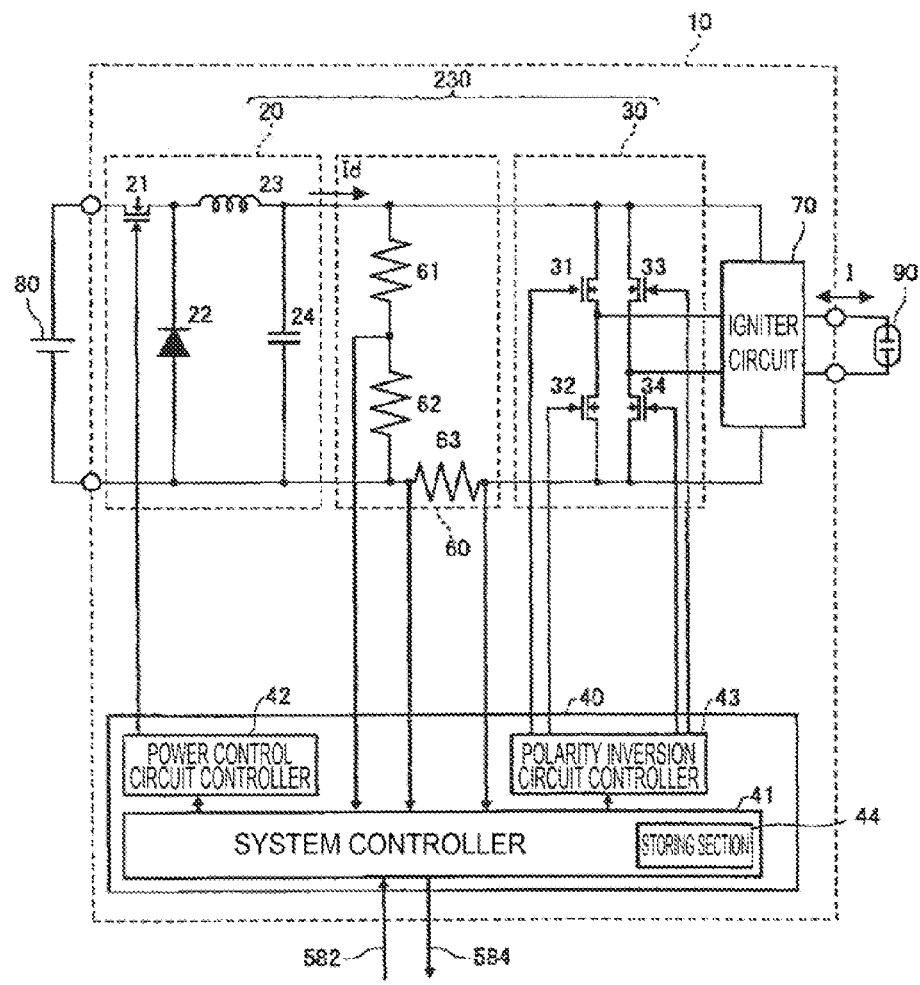
FIG. 4 is a circuit diagram of a discharge lamp lighting device in the embodiment.

FIG. 4 is a diagram showing an example of a circuit configuration of the discharge lamp lighting device 10.

The discharge lamp lighting device 10 includes, as shown in FIG. 4, a power control circuit 20, a polarity inversion circuit 30, a control section 40, an operation detecting section 60, and an igniter circuit 70.

The power control circuit 20 generates driving power to be supplied to the discharge lamp 90. In this embodiment, the power control circuit 20 is configured by a down chopper circuit that receives a voltage input from the direct-current power supply device 80, steps down the input voltage, and outputs a direct current Id.

The power control circuit 20 includes a switch element 21, a diode 22, a coil 23, and a capacitor 24. The switch element 21 is configured by, for example, a transistor. In this embodiment, one end of the switch element 21 is connected to a positive voltage side of the direct-current power supply device 80. The other end is connected to a cathode terminal of the diode 22 and one end of the coil 23.

One end of the capacitor 24 is connected to the other end of the coil 23. The other end of the capacitor 24 is connected to an anode terminal of the diode 22 and a negative voltage side of the direct-current power supply device 80. A current control signal is input to a control terminal of the switch element 21 from the control section 40 to control ON/OFF of the switch element 21. As the current control signal, for example, a PWM (Pulse Width Modulation) control signal may be used.

When the switch element 21 is turned, on, an electric current flows to the coil 23 and energy is stored in the coil 23. Thereafter, when the switch element 21 is turned off, the energy stored in the coil 23 is discharged through a route that passes the capacitor 24 and the diode 22. As a result, the direct current Id corresponding to a ratio of time in which the switch element 21 is on is generated.

The polarity inversion circuit 30 inverts, at predetermined timing, the polarity of the direct current Id input from the power control circuit 20. Consequently, the polarity inversion circuit 30 generates and outputs the driving current I, which is a direct current that continues for a controlled time, or the driving current I, which is an alternating current having any frequency. In this embodiment, the polarity inversion circuit 30 is configured by an inverter bridge circuit (a full bridge circuit).

The polarity inversion circuit 30 includes a first switch element 31, a second switch element 32, a third switch element 33, and a fourth switch element 34 configured by a transistor or the like. The polarity inversion circuit 30 includes a configuration in which the first switch element 31 and the second switch element 32 connected in series and the third switch element 33 and the fourth switch element 34 connected in series are connected in parallel to each other. Polarity inversion control signals are respectively input to control terminals of the first switch element 31, the second switch element 32, the third switch element 33, and the fourth switch element 34 from the control section 40. ON/OFF operations of the first switch element 31, the second switch element 32, the third switch element 33, and the fourth switch element 34 are controlled on the basis of the polarity inversion control signals.

The polarity inversion circuit 30 repeats an operation for alternately turning on and off the first and fourth switch elements 31 and 34 and the second and third switch elements 32 and 33. Consequently, the polarities of the direct-current Id output from the power control circuit 20 are alternately inverted. The polarity inversion circuit 30 generates the driving current I, which is a direct current that continues the same polarity state for a controlled time, or the driving current I, which is an alternating current having a controlled frequency, and outputs the driving current from a common connection point of the first switch element 31 and the second switch element 32 and a common connection point of the third switch element 33 and the fourth switch element 34.

That is, the polarity inversion circuit 30 performs control such that, when the first switch element 31 and the fourth switch element 34 are on, the second switch element 32 and the third switch element 33 are off and, when the first switch element 31 and the fourth switch element 34 are off, the second switch element 32 and the third switch element 33 are on. Therefore, when the first switch element 31 and the fourth switch element 34 are on, the driving current I that flows from one end of the capacitor 24 to the first switch element 31, the discharge lamp 90, and the fourth switch element 34 in this order is generated. When the second switch element 32 and the third switch element 33 are on, the driving current I that flows from one end of the capacitor 24 to the third switch element 33, the discharge lamp 90, and the second switch element 32 in this order is generated.

In this embodiment, a combined portion of the power control circuit 20 and the polarity inversion circuit 30 corresponds to a discharge lamp driving section 230. That is, the discharge lamp driving section 230 supplies the driving current I for driving the discharge lamp 90 to the discharge lamp 90.

The control section 40 controls the discharge lamp driving section 230. In the example shown in FIG. 4, the control section 40 controls the power control circuit 20 and the polarity inversion circuit 30 to thereby control a retention time in which the driving current I continues the same polarity and a current value, a frequency, and the like of the driving current I. In this embodiment, the driving current I is an alternating current, a waveform of which is a rectangular wave. A driving frequency of the driving current I is equal to or higher than 1 kHz. Details are explained below.

The control section 40 applies, to the polarity inversion circuit 30, according to polarity inversion timing of the driving current I, polarity inversion control for controlling a retention time in which the driving current I continues in the same polarity and a frequency and the like of the driving current I. The control section 40 applies, to the power control circuit 20, current control for controlling a current value of the direct current Id output from the power control circuit 20.

The configuration of the control section 40 is not particularly limited. In this embodiment, the control section 40 includes a system controller 41, a power control circuit controller 42, and a polarity inversion circuit controller 43. Note that a part or all of the control section 40 may be configured by a semiconductor integrated circuit.

The system controller 41 controls the power control circuit controller 42 and the polarity inversion circuit controller 43 to thereby control the power control circuit 20 and the polarity inversion circuit 30. The system controller 41 may control the power control circuit controller 42 and the polarity inversion circuit controller 43 on the basis of a lamp voltage Vla and the driving current I detected by the operation detecting section 60.

In this embodiment, the system controller 41 includes a storing section 44. The storing section 44 may be provided independently from the system controller 41.

The system controller 41 may control the power control circuit 20 and the polarity inversion circuit 30 on the basis of information stored in the storing section 44. In the storing section 44, information concerning driving parameters such as a retention time in which the driving current I continues in the same polarity and a current value, a frequency, a waveform, a modulation pattern, and the like of the driving current I may be stored.

The power control circuit controller 42 outputs a current control signal to the power control circuit 20 on the basis of a control signal from the system controller 41 to thereby control the power control circuit 20.

The polarity inversion circuit controller 43 outputs a polarity inversion control signal to the polarity inversion circuit 30 on the basis of a control signal from the system controller 41 to thereby control the polarity inversion circuit 30.

The control section 40 is realised using a dedicated circuit and can be configured to perform the control explained above and various kinds of control of processing explained, below. For example, a CPU executes a control program stored in the storing section 44, whereby the control section 40 can function as a computer and perform the various kinds of control of the processing.

Figure 5:
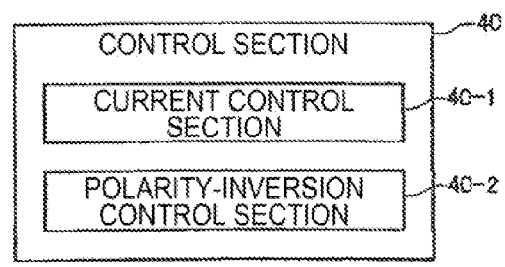
FIG. 5 is a block diagram showing a configuration example of a control section in the embodiment.

FIG. 5 is a diagram for explaining another configuration example of the control section 40. As shown in FIG. 5, the control section 40 may be configured to function as, according to a control program, a current control section 40-1 that controls the power control circuit 20 and a polarity-inversion control section 40-2 that controls the polarity inversion circuit 30.

In the example shown in FIG. 4, the control section 40 is configured as a part of the discharge lamp lighting device 10. On the other hand, the CPU 580 may be configured to perform a part of the functions of the control section 40.

The operation detecting section 60 may include, for example, a voltage detecting section that detects the lamp voltage V1a of the discharge lamp 90 and outputs driving voltage information to the control section 40 and a current detecting section that detects the driving current I and outputs driving current information to the control section 40. In this embodiment, the operation detecting section 60 includes a first resistor 61, a second resistor 62, and a third resistor 63.

In this embodiment, the voltage detecting section detects the lamp voltage V1a according to a voltage divided by the first resistor 61 and the second resistor 62 connected in series to each other in parallel to the discharge lamp 90. In this embodiment, the current detecting section detects the driving current I according to a voltage generated in the third resistor 63 connected in series to the discharge lamp 90.

The igniter circuit 70 operates only when lighting of the discharge lamp 90 is started. The igniter circuit 70 supplies, between the electrodes (between the first electrode 92 and the second electrode 93) of the discharge lamp 90, a high voltage (a voltage higher than a voltage during normal lighting time of the discharge lamp 90) necessary for dielectrically breaking the electrodes (the first electrode 92 and the second electrode 93) of the discharge lamp 90 and forming a discharge path during the lighting start of the discharge lamp 90. In this embodiment, the igniter circuit 70 is connected in parallel to the discharge lamp 90.

A relation between the polarity of the driving current I and the temperature of the electrodes is explained below.

Figure 6A:
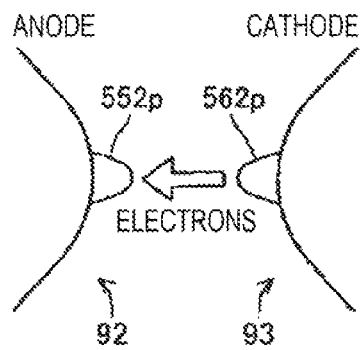
FIGS. 6A to 6D are explanatory diagrams for explaining a relation between the polarity of a driving current supplied to a discharge lamp and the temperature of electrodes.
Figure 6B:
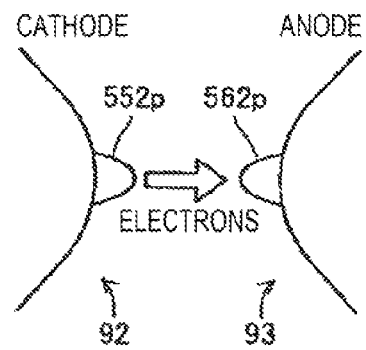

FIGS. 6A to 6D are explanatory diagrams showing a relation between the polarity of the driving current I supplied to the discharge lamp 90 and the temperature of the electrodes. FIGS. 6A and 6B show operation states of the first electrode 92 and the second electrode 93. In the figures, distal end portions of the first electrode 92 and the second electrode 93 are shown. Protrusions 552p and 562p are respectively formed at the distal ends of the first electrode 92 and the second electrode 93. Electric discharge that occurs between the first electrode 92 and the second electrode 93 mainly occurs between a protrusion 552p and a protrusion 562p. When the protrusions 552p and 562p are present as in this embodiment, compared with when protrusions are absent, it is possible to suppress movement of discharge positions (positions of arc bright spots) in the first electrode 92 and the second electrode 93.

FIG. 6A shows a first polarity state P1 in which the first electrode 92 operates as an anode and the second electrode 93 operates as a cathode. In the first polarity state P1, electrons move from the second electrode 93 (the cathode) to the first electrode 92 (the anode) according to electric discharge. Electrons are emitted from the cathode (the second electrode 93). The electrons emitted from the cathode (the second electrode 93) collide with the distal end of the anode (the first electrode 92). Heat is generated by the collision and the temperature of the distal end (the protrusion 552p) of the anode (the first electrode 92) rises.

FIG. 6B shows a second polarity state P2 in which the first electrode 92 operates as a cathode and the second electrode 93 operates as an anode. In the second polarity state P2, electrons move from the first electrode 92 to the second electrode 93 oppositely to the first polarity state P1. As a result, the temperature of the distal end (the protrusion 562p) of the second electrode 93 rises.

In this way, the temperature of the anode, with which the electrons collide, tends to be high compared with the temperature of the cathode that emits the electrons.

Figure 6C:
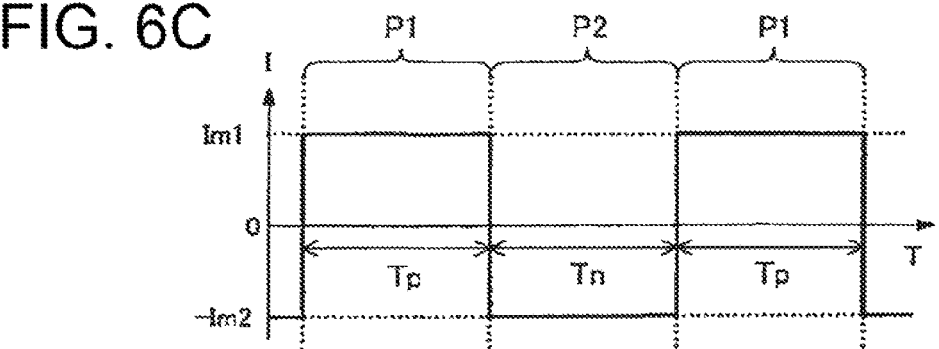

FIG. 6C is a timing chart showing an example of the driving current I supplied to the discharge lamp 90. The abscissa indicates time T and the ordinate indicates a current value of the driving current I. The driving current I indicates an electric current flowing through the discharge lamp 90. A positive value indicates the first polarity state P1 and a negative value indicates the second polarity state P2.

In this embodiment, as shown in FIG. 6C, a rectangular wave alternating current is used as the driving current I. In this embodiment, the driving current I is supplied to the discharge lamp 90 such that the first polarity state P1 and the second polarity state P2 are alternately repeated. The driving current I is supplied to the discharge lamp 90. A first polarity section Tp indicates time in which the first polarity state P1 continues. A second polarity section Tn indicates time in which the second polarity state P2 continues.

In the example shown in FIG. 6C, an average current value of the first polarity section Tp is Im1 and an average current value of the second, polarity section Tn is −Im2. A driving frequency of the driving current I suitable for the driving of the discharge lamp 90 can be experimentally determined according to characteristics of the discharge lamp 90. In this embodiment, the driving frequency of the driving current I is set to be equal to or higher than 1 kHz. By setting the driving frequency of the driving current I in this way, it is possible to suppress blackening and devitrification of the discharge lamp 90. The other values Im1, −Im2, Tp, and Tn can also be experimentally determined.

Figure 6D:
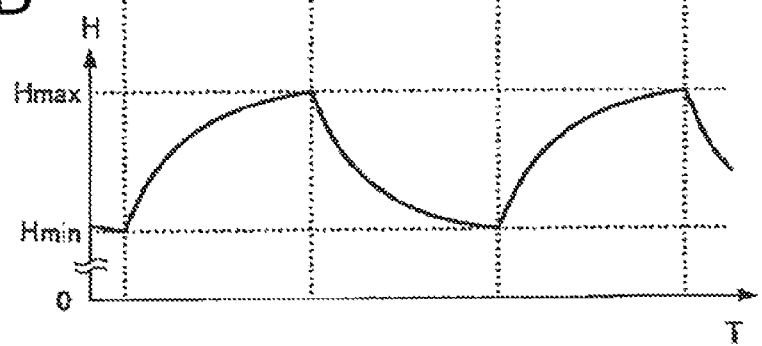

FIG. 6D is a timing chart showing a temperature change of the first electrode 92. The abscissa indicates time T and the ordinate indicates temperature H. In the first polarity state P1, the temperature H of the first electrode 92 rises and, in the second polarity state P2, the temperature H of the first electrode 92 falls. Since the first polarity state P1 and the second polarity state P2 are repeated, the temperature H cyclically changes between a minimum Hmin and a maximum Hmax. Although not shown in the figure, the temperature of the second electrode 93 changes in a phase opposite to a phase of the temperature H of the first electrode 92. That is, in the first polarity state P1, the temperature of the second electrode 93 falls and, in the second polarity state P2, the temperature of the second electrode 93 rises.

The control of the discharge lamp driving section 230 by the control section 40 is explained.

Figure 7:
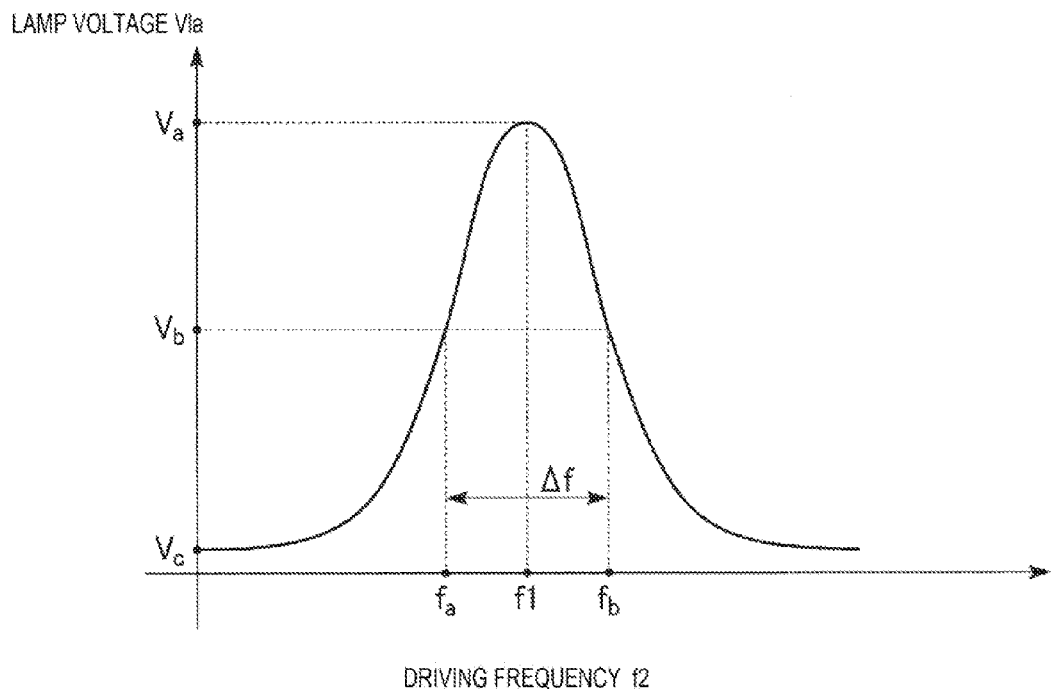
FIG. 7 is a graph showing a change in a lamp voltage in the vicinity of a natural frequency of the discharge lamp.
Figure 8:
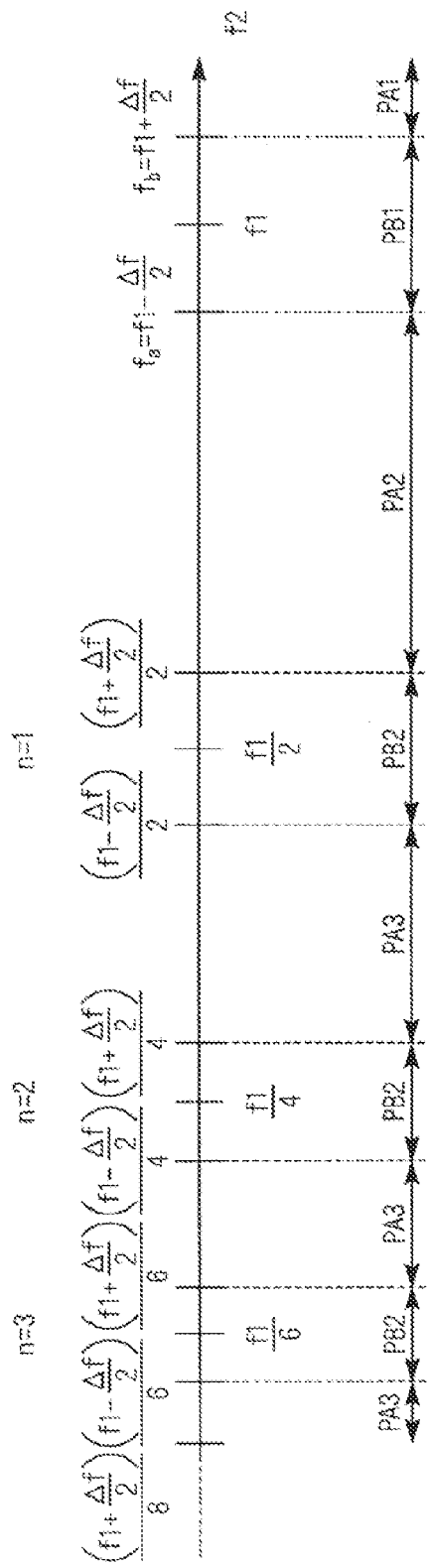
FIG. 8 is a diagram showing a range in which a driving frequency is set in this embodiment.

FIGS. 7 and 8 are explanatory diagrams for explaining a frequency range of a driving frequency f2 of a driving current supplied to the discharge lamp 90 from the discharge lamp driving section 230 controlled by the control section 40. FIG. 7 is a graph showing a change in the lamp voltage V1a in the vicinity of a natural frequency f1 of the discharge lamp 90. In FIG. 7, the ordinate indicates the lamp voltage V1a and the abscissa indicates the driving frequency f2. FIG. 8 is a diagram showing a range in which the driving frequency f2 is set.

The control section 40 controls the discharge lamp driving section 230 such that the driving frequency f2 satisfies any one of the following Expressions 1 to 3.

$$f2 > f1 + \Delta f/2 \quad \text{Expression 1}$$

$$(f1 + \Delta f/2)/2 < f2 < f1 - \Delta f/2 \quad \text{Expression 2}$$

$$(f1 + \Delta f/2)/2(n+1) < f2 < (f1 - \Delta f/2)/2n \quad \text{Expression 3}$$

As shown in FIG. 7, $\Delta f$ is a half value width of the lamp voltage V1a at the time when the driving frequency f2 has a value same as the natural frequency f1. When the driving frequency f2 is a value same as the natural frequency f1 of the discharge lamp 90 or a value in the vicinity of the natural frequency f1, the acoustic resonance phenomenon occurs and the lamp voltage V1a rises from a lamp voltage Vc in a steady state to a lamp voltage Va. That is, the lamp voltage V1a has a peak at the natural frequency f1. The half value width $\Delta f$ is a difference between a frequency fa and a frequency fb at the time when the lamp voltage V1a is a lamp voltage Vb, which is a half value of the lamp voltage Va with respect to the lamp voltage Vc in the steady state. The lamp voltage Vb is represented by Vb=(Va+Vc)/2. In other words, the half value width $\Delta f$ is a half value width of the lamp voltage V1a of the discharge lamp 90 at the time when the driving current I is supplied with the driving frequency varied to be lower and higher than the natural frequency f1 set as a center value.

In Expression 3, n is a natural number. In this specification, the natural number means an integer larger than 0.

The acoustic resonance phenomenon is a phenomenon in which oscillation of a discharge lamp caused by switching of the polarity of a lamp voltage applied to electrodes of the discharge lamp causes resonance with a natural frequency of the discharge lamp. The oscillation of the discharge lamp occurs when gas density in the discharge lamp changes because of a density change of plasma inside the discharge lamp due to the switching of the polarity. When the acoustic resonance phenomenon occurs, a light amount of the discharge lamp fluctuates. The fluctuation in the light amount appears as flickering of the discharge lamp. When the light amount fluctuation occurs because of the acoustic resonance phenomenon, deflection of an arc of arc discharge generated between the electrodes occurs. The lamp voltage rises because of action equivalent to an increase in an interelectrode distance. When the acoustic resonance phenomenon occurs, breakage of the discharge lamp such as bending of the electrodes sometimes occurs.

Note that, in the following explanation, it is assumed that the light amount fluctuation due to the acoustic resonance phenomenon is equivalent to the rise of the lamp voltage V1a.

A range of the driving frequency f2 set by Expressions 1 to 3 is a range not including a range of the half value width $\Delta f$ centering on the natural frequency f1 of the discharge lamp 90 and a range of $1/2n$ times the half value width $\Delta f$ centering on $1/2n$ times the natural frequency f1. The frequency range is specifically explained below with reference to FIG. 8.

A range indicated by Expression 1 is a range PA1 in FIG. 8. The range PA1 is a range of a frequency larger than a value obtained by adding 1/2 times the half value width $\Delta f$ to the natural frequency f1. In Expression 1, $f1 + \Delta f/2$ is the frequency fb shown in FIG. 7. That is, the range PA1 is a range of a frequency larger than the frequency fb shown in FIG. 7.

A range indicated by Expression 2 is a range PA2 in FIG. 8. The range PA2 is a range of a frequency smaller than a value obtained by subtracting 1/2 times the half value width $\Delta f$ from the natural frequency f1 and a range of a frequency larger than 1/2 times a value obtained by adding 1/2 times the half value width $\Delta f$ to the natural frequency f1. In Expression 2 $f1 - \Delta f/2$ is the frequency fa shown in FIG. 7.

A range indicated by Expression 3 is a range PA3 in FIG. 8. The range PA3 is a range of a frequency smaller than $1/2n$ times the value obtained by subtracting 1/2 times the half value width $\Delta f$ from the natural frequency f1 and a range of a frequency larger than $1/2(n+1)$ of the value obtained by adding 1/2 times the half value width $\Delta f$ to the natural frequency f1. In the specific example shown in FIG. 8, when n=1, the range PA3 is a range of $(f1+\Delta f/2)/4 < f2 < (f1-\Delta f/2)/2$. When n=2, the range PA3 is a range of $(f1+\Delta f/2)/6 < f2 < (f1-\Delta f/2)/4$. When n=3, the range PA3 is a range of $(f1+\Delta f/2)/8 < f2 < (f1-\Delta f/2)/6$.

The setting of the driving frequency f2 can be rephrased as follows: the control section 40 controls the discharge lamp driving section 230 such that the driving frequency f2 does not satisfy the following Expression 4 and Expression 5.

$$f1 - \Delta f/2 \le f2 \le f1 + \Delta f/2 \quad \text{Expression 4}$$

$$(f1 - \Delta f/2)/2n \le f2 \le (f1 + \Delta f/2)/2n \quad \text{Expression 5}$$

A range indicated by Expression 4 is a range PB1 in FIG. 8. That is, the range PB1 is a range of the half value width $\Delta f$ centering on the natural frequency f1.

A range indicated by Expression 5 is a range PB2 in FIG. 8. That is, the range PB2 is a range of $1/2n$ times the half value width $\Delta f$ centering on $1/2n$ times the natural frequency f1, for example, f1/2, f1/4, or f1/6.

Expression 5 may be rewritten as follows.

$$f1 - \Delta f/2 \le 2n \cdot f2 \le f1 + \Delta f/2 \quad \text{Expression 5a}$$

That is, the control section 40 controls the discharge lamp driving section 230 such that a frequency 2n times as high as the driving frequency f2 is not included in the range of the half value width $\Delta f$ centering on the natural frequency f1.

The control of the discharge lamp driving section 230 by the control section 40 can also be expressed as a discharge lamp lighting method (a discharge lamp driving method). That is, the discharge lamp lighting method in this embodiment is characterized in that the driving frequency f2 is set to satisfy any one of the above Expressions 1 to 3.

According to this embodiment, the driving frequency f2 of the driving current is set to satisfy any one of the above Expressions 1 to 3. Therefore, it is possible to sufficiently suppress the acoustic resonance phenomenon. The setting of the driving frequency f2 is explained in detail below.

The acoustic resonance phenomenon occurs not only when the frequency of the driving current coincides with the natural frequency of the discharge lamp but also when the frequency of the driving current coincides with the frequency of $1/2n$ times the natural frequency. Therefore, simply by setting the frequency of the driving current to avoid the natural frequency of the discharge lamp, the acoustic resonance phenomenon cannot be sufficiently suppressed. As a result, flickering of the discharge lamp and breakage of the discharge lamp sometimes occur.

According to this embodiment, the driving frequency f2 is set to satisfy any one of Expressions 1 to 3. Therefore, the driving frequency f2 is set to a frequency different from the natural frequency f1 of the discharge lamp and the frequency of 1/2n times the natural frequency f1. Consequently, it is possible to obtain the discharge lamp lighting device that can sufficiently suppress the acoustic resonance phenomenon.

As shown in FIG. 7, the acoustic resonance phenomenon occurs in a range of a certain width with respect to the natural frequency f1. Therefore, even if the driving frequency f2 does not coincide with the natural frequency f1, when the driving frequency f2 is set in the vicinity of the natural frequency f1, in some case, the acoustic resonance phenomenon occurs and flickering of the discharge lamp and breakage of the discharge lamp occur.

As shown in FIG. 7, as the driving frequency f2 further separates from the natural frequency f1, the lamp voltage V1a fails to be closer to the lamp voltage Vc in the steady state. When the driving frequency f2 separates from the natural frequency f1 more than $\Delta f/2$, that is, when the driving frequency f2 is outside a range of the half value width $\Delta f$ centering on the natural frequency f1, the influence on the discharge lamp by the acoustic resonance phenomenon is sufficiently reduced. It is possible to sufficiently suppress flickering of the discharge lamp and breakage of the discharge lamp. Specifically, by setting the driving frequency f2 in this way, for example, it is possible to reduce a light amount fluctuation ratio of the discharge lamp to be smaller than 2%. When the light amount fluctuation ratio of the discharge lamp is smaller than 2%, a user can hardly recognize flickering of the discharge lamp and breakage of the discharge lamp hardly occurs.

The above description holds true not only concerning the natural frequency f1 but also concerning the frequency of 1/2n times the natural frequency f1. That is, even if the driving frequency f2 is not set to coincide with the frequency of 1/2n times the natural frequency f1, when the driving frequency f2 is set in the vicinity of the frequency of 1/2n times the natural frequency f1, in some case, the acoustic resonance phenomenon occurs and flickering of the discharge lamp and breakage of the discharge lamp occur. Ax the frequency of 1/2n times the natural frequency f1, the driving frequency f2 is set to be outside the range of 1/2n times the natural frequency f1. Consequently, it is possible to sufficiently suppress the acoustic resonance phenomenon.

The inventors have clarified anew the knowledge that the acoustic resonance phenomenon occurs not only when the frequency of the driving current coincides with the natural frequency of the discharge lamp but also when the frequency of the driving current coincides with the frequency of 1/2n times the natural frequency and when the frequency of the driving current is in the vicinity of the natural frequency and the frequency of 1/2n times the natural frequency. Further, the inventors have also clarified anew the knowledge that it is possible to sufficiently suppress the acoustic resonance phenomenon by setting the frequency of the driving current to avoid the range of the half value width centering on the natural frequency and the range of 1/2n times the half value width of the natural frequency centering on 1/2n times the natural frequency. The inventors have also clarified anew the knowledge that, when the light amount fluctuation ratio is smaller than 2%, the user can hardly recognize flickering of the discharge lamp and breakage of the discharge lamp hardly occurs.

According to this embodiment, since the driving frequency f2 is set to satisfy any one of Expressions 1 to 3, the driving frequency f2 is set in a range of a frequency not including the range of the half value width $\Delta f$ of the natural frequency f1 and the range of 1/2n times the half value width $\Delta f$ centering on the frequency of 1/2n times the natural frequency f2. Therefore, according to this embodiment, it is possible to more effectively suppress the acoustic resonance phenomenon.

According to this embodiment, since the light source device and the projector include the discharge lamp lighting device 10, it is possible to obtain the light source device and the projector that can improve the service life of the discharge lamp 90.

Note that, in this embodiment, configurations explained below can also be adopted.

In this embodiment, the control section 40 may be configured to control the discharge lamp driving section 230 such that the driving frequency f2 is only set to be a frequency different from the natural frequency f1 and the frequency of 1/2n times the natural frequency f1. That is, specifically, the driving frequency f2 may be only set to be a frequency other than f1, f1/2, f1/4, f1/6, and the like.

For example, when a waveform of a driving current is a sine wave, compared with when the waveform of the driving current is the rectangular wave as in this embodiment, a range of a frequency in which the acoustic resonance phenomenon occurs in the range of the natural frequency f1 is narrow. Therefore, for example, when the waveform of the driving current is the sine wave, even when the frequency of the driving current is only set to be a frequency different from the natural frequency f1 and the frequency of 1/2n times the natural frequency f1 as explained above, it is possible to sufficiently suppress the acoustic resonance phenomenon.

In this embodiment, the waveform of the driving current does not have to be the rectangular wave. For example, in this embodiment, the waveform of the driving current may be a sine wave, a triangular wave, and the like.

In this embodiment, the frequency of the driving current may be smaller than 1 kHz.

In the embodiment explained above, as an aspect of the invention, the light source device including the discharge lamp lighting device and the projector including the light source device are explained. However, the invention is not limited to this. Devices to which the discharge lamp lighting device according to the invention is applied are not particularly limited.

EXAMPLES

Example 1

In an example 1, the driving frequency of the driving current supplied, to the discharge lamp was changed to verify whether the acoustic resonance phenomenon occurred at 1/2n times the natural frequency of the discharge lamp. Determination concerning whether the acoustic resonance phenomenon occurred was made by measuring a change in a lamp voltage. That is, when the lamp voltage rose while having a peak, it was determined that the acoustic resonance phenomenon occurred.

First, the natural frequency of the discharge lamp was measured. A ripple frequency of the driving current supplied to the discharge lamp was changed between 50 kHz and 100 kHz and a change in the lamp voltage was measured.

The discharge lamp used for the measurement was an ultrahigh pressure mercury lamp having rated power of 230 W. A material forming a discharge lamp main body was quartz glass. A material forming electrodes was tungsten. Gas encapsulated inside the discharge lamp was mixed gas of argon, mercury, and methyl bromide. Pressure inside the discharge lamp when lit was set to 200 atm. An interelectrode distance was set to 1.1 mm.

Figure 9:
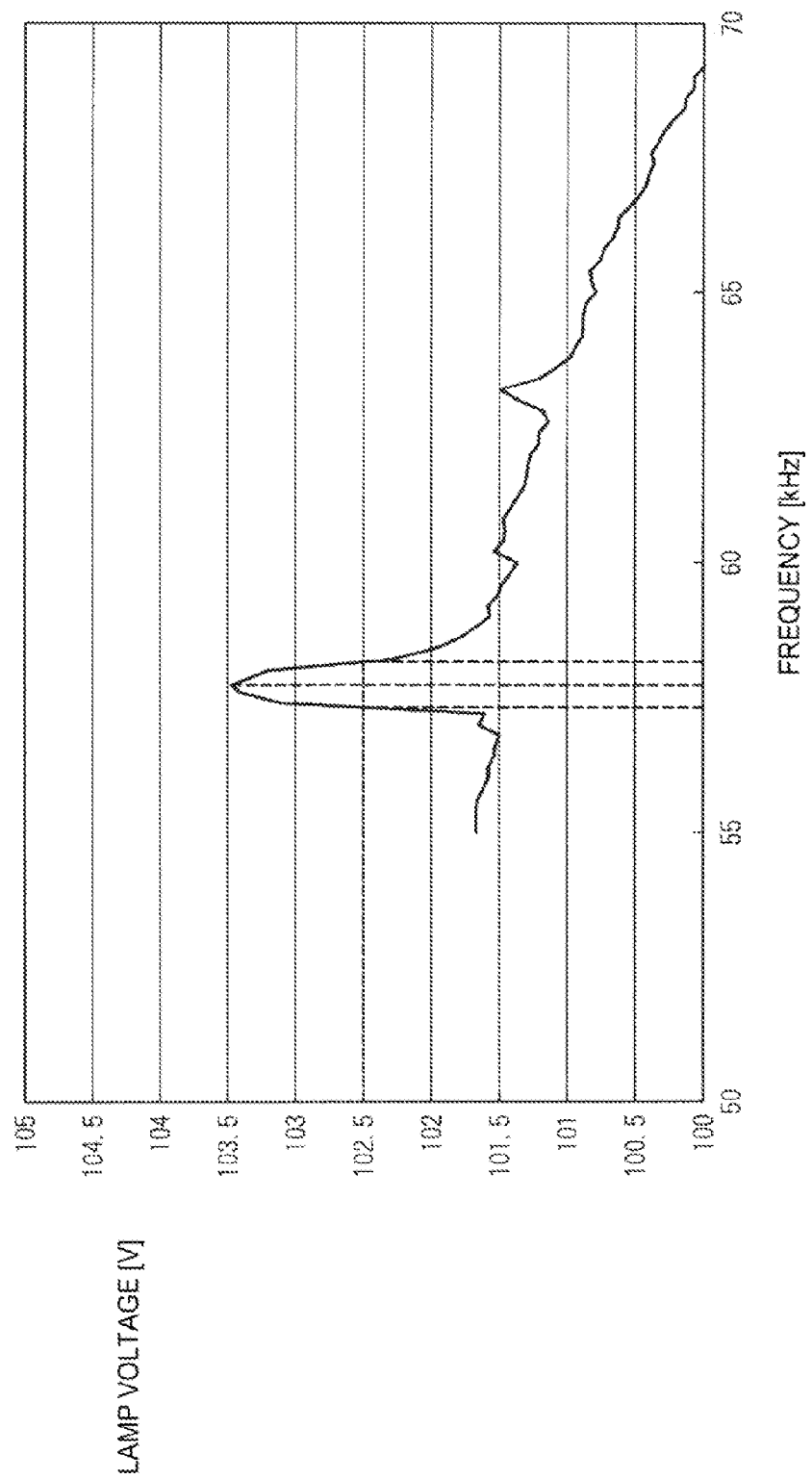
FIG. 9 is a graph showing a result of an example 1.

A result is shown in FIG. 9. In FIG. 9, the ordinate indicates a lamp voltage [V] applied to the discharge lamp and the abscissa indicates a ripple frequency [kHz] of the driving current.

From FIG. 9, a peak was confirmed in a position where the ripple frequency was 57.8 kHz. Therefore, it was verified that the natural frequency of the discharge lamp was 57.8 kHz.

Figure 10:
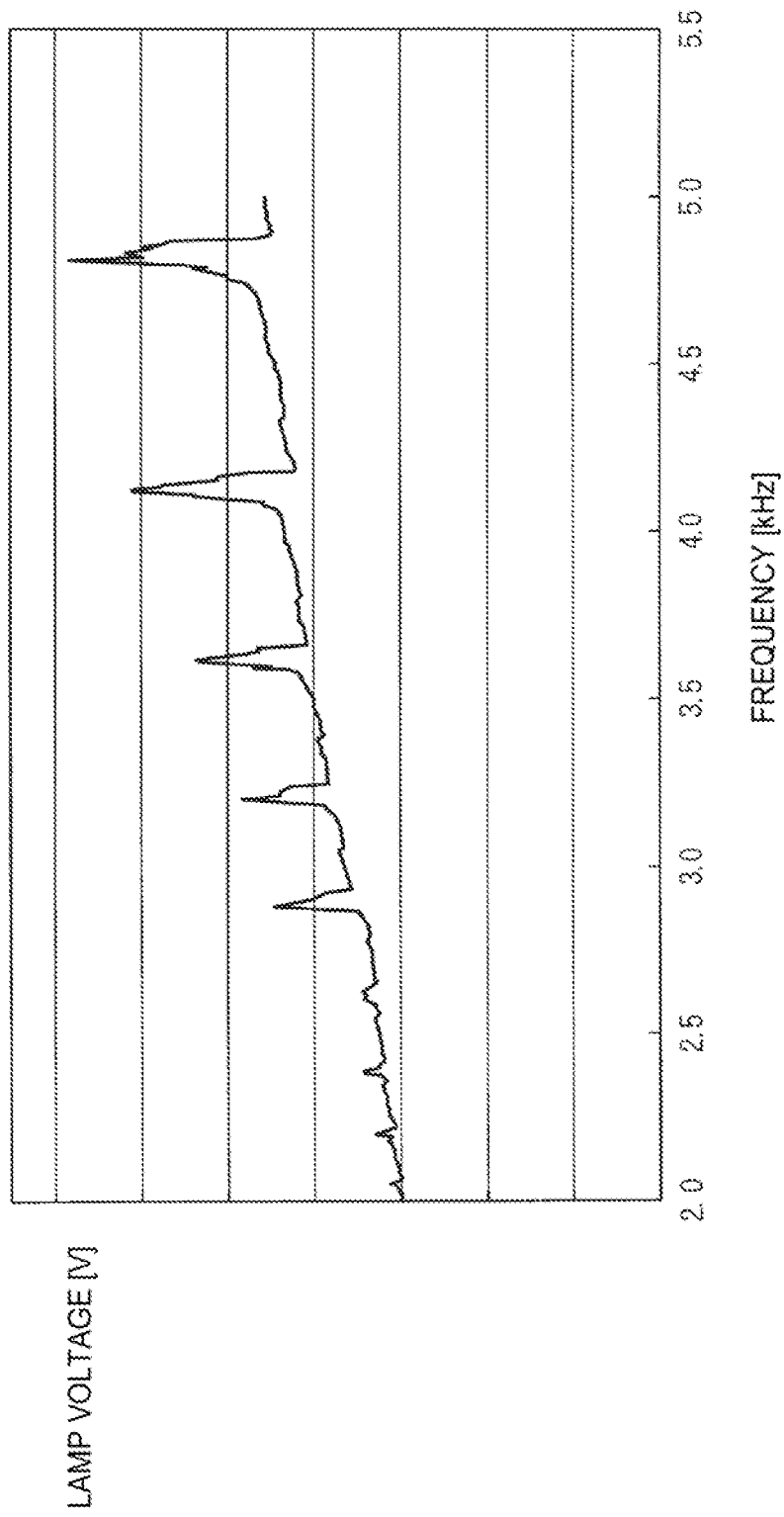
FIG. 10 is a graph showing a result of the example 1.

Subsequently, driving frequency of the driving current supplied to the discharge lamp was changed from 2.0 kHz to 5.0 kHz and a change in the lamp voltage was measured. A result is shown in FIG. 10. In FIG. 10, the ordinate indicates the lamp voltage applied to the discharge lamp and the abscissa indicates a frequency [Hz] of the driving current.

From FIG. 10, it was confirmed that peaks occurred cyclically. Positions of the peaks were 4.82 kHz, 4.13 kHz, 3.61 kHz, 3.21 kHz, and 2.89 kHz. Values of the frequencies are respectively values about 1/12 times, about 1/14 times, about 1/16 times, about 1/18 times, and about 1/20 times as large as the natural frequency of 57.8 kHz. Consequently, it was verified that the acoustic resonance phenomenon occurred at a frequency in a position of 1/2n times the natural frequency.

Example 2

In an example 2, a light amount fluctuation ratio (%) of the discharge lamp at the time when the driving frequency f2 of the driving current supplied to the discharge lamp was changed was measured. The light amount fluctuation ratio was a fluctuation ratio of a maximum value of a light amount at the time when the discharge lamp was lit for 10 minutes with respect to a light amount of the discharge lamp in a steady lighting state. As the discharge lamp, a discharge lamp same as the discharge lamp in the example 1 was used.

First, a half value width of the natural frequency of the discharge lamp calculated in the example 1 was calculated. From FIG. 9, it was confirmed that, at the peak of 57.8 kHz of the natural frequency, a lamp voltage rose from about 101.5 V to about 103.5 V. That is, a half value of the peak at the natural frequency was about 102.5 V. Frequencies at the lamp voltage of about 102.5 V were 57.4 kHz and 58.2 kHz. Therefore, it was found that the half value width of the natural frequency of the discharge lamp was 800 Hz. That is, it was found that a range of the half value width of the natural frequency was equal to or higher than 57.4 kHz and equal to or lower than 58.2 kHz.

Subsequently, measurement was performed when the driving frequency f2 of the driving current was increased from 4.08 kHz to 4.2 kHz at an interval of 0.2 kHz and when the driving frequency f2 was increased from 4.76 kHz to 4.86 kHz at an interval of 0.2 kHz. It was determined whether the acoustic resonance phenomenon was able to be sufficiently suppressed. A result is shown in Table 1.

TABLE 1

| f2 (kHz) | n1 | 2 * n1 * f2 (kHz) | n2 | 2 * n2 * f2 (kHz) | n3 | 2 * n3 * f2 (kHz) | light amount fluctuation ratio (%) | Determination result |
|---|---|---|---|---|---|---|---|---|
| 4.08 | 6 | 48.96 | 7 | 57.12 | 8 | 65.28 | 1.80 | A |
| 4.1 | 6 | 49.2 | 7 | 57.4 | 8 | 65.6 | 2.10 | B |
| 4.12 | 6 | 49.44 | 7 | 57.68 | 8 | 65.92 | 4.00 | B |
| 4.14 | 6 | 49.68 | 7 | 57.96 | 8 | 66.24 | 6.50 | B |

TABLE 1-continued

| f2 (kHz) | n1 | 2 * n1 * f2 (kHz) | n2 | 2 * n2 * f2 (kHz) | n3 | 2 * n3 * f2 (kHz) | light amount fluctuation ratio (%) | Determination result |
|---|---|---|---|---|---|---|---|---|
| 4.16 | 6 | 49.92 | 7 | 58.24 | 8 | 66.56 | 1.90 | A |
| 4.18 | 6 | 50.16 | 7 | 58.52 | 8 | 66.88 | 1 | A |
| 4.2 | 6 | 50.4 | 7 | 58.8 | 8 | 67.2 | 0.90 | A |
| 4.76 | 5 | 47.6 | 6 | 57.12 | 7 | 66.64 | 1.10 | A |
| 4.78 | 5 | 47.8 | 6 | 57.36 | 7 | 66.92 | 1.50 | A |
| 4.8 | 5 | 48 | 6 | 57.6 | 7 | 67.2 | 4 | B |
| 4.82 | 5 | 48.2 | 6 | 57.84 | 7 | 67.48 | 7 | B |
| 4.84 | 5 | 48.4 | 6 | 58.08 | 7 | 67.76 | 3.30 | B |
| 4.86 | 5 | 48.6 | 6 | 58.32 | 7 | 68.04 | 1.50 | A |

In Table 1, driving frequencies f2 and values 2n times, that is, 2·n1 times, 2·n2 times, and 2·n3 times as large as the driving frequencies f2 are shown. Specifically, at the driving frequencies f2 of 4.08 kHz to 4.2 kHz, values 12 times (n1=6), 14 times (n2=7), and 16 times (n3=8) as large as the driving frequencies f2 are shown. At the driving frequencies f2 of 4.76 kHz to 4.86 kHz, 10 times (n1=5), 12 times (n2=6), and 14 times (n3=7) as large as the driving frequencies f2 are shown.

Determination concerning whether the acoustic resonance phenomenon was able to be sufficiently suppressed was made according to whether the light amount fluctuation ratio was smaller than 2.0%. That is, when the light amount fluctuation ratio was smaller than 2.0%, it was determined that the acoustic resonance phenomenon was able to be sufficiently suppressed. When the light amount fluctuation ratio was equal to or larger than 2.0%, it was determined that the suppression of the acoustic resonance phenomenon was insufficient. This is because, as explained above, when the light amount fluctuation ratio is smaller than 2.0%, it is possible to sufficiently suppress flickering and breakage of the discharge lamp. In Table 1, the determination that the acoustic resonance phenomenon was able to be sufficiently suppressed is indicated by "A" and the determination that the suppression of the acoustic resonance phenomenon was insufficient is indicated by "B".

It was found from Table 1 that, when the driving frequency f2 was 4.1 kHz to 4.14 kHz and when the driving frequency f2 was 4.8 kHz to 4.84 kHz, frequencies 2·n2 times as large as the driving frequencies were within a range of the half value width of the natural frequency. That is, it was found that the frequencies 2·n2 times as large as the driving frequencies were within a range of a frequency equal to or higher than 57.4 kHz and equal to or lower than 58.2 kHz. When the driving frequencies f2 are 4.1 kHz to 4.14 kHz, n2 is 7. When the driving frequencies f2 are 4.8 kHz to 4.84 kHz, n2 is 6. It was verified, that the light amount fluctuation ratio at the time when the driving frequencies f2 were within the range was equal to or larger than 2.0%.

On the other hand, when the driving frequencies f2 were the other values, values 2n times as large as the driving frequencies f2 were not within the range of the half value width of the natural frequency. That is, all the values 2n times as large as the driving frequencies f2 were smaller than 57.4 kHz and larger than 58.2 kHz. It was verified that the light amount fluctuation ratio was smaller than 2.0% when the driving frequencies f2 were in a range of these numerical values.

Consequently, according to this example, it was verified that it is possible to sufficiently suppress the acoustic resonance phenomenon by setting the driving frequency f2 in a range in which the driving frequency f2 avoid the half value width of the natural frequency.

The entire disclosure of Japanese Patent Application No. 2013-250841, filed Dec. 4, 2013 is expressly incorporated by reference herein.

What is claimed is:

1. A discharge lamp driving device comprising:
a discharge lamp driving section configured to supply a driving current to a discharge lamp, the driving current being an alternating current for driving the discharge lamp; and
a control section configured to control the discharge lamp driving section, wherein
the control section controls the discharge lamp driving section such that the driving current having a driving frequency different from a natural frequency of the discharge lamp and a frequency of 1/2n (n is a natural number) times the natural frequency is supplied to the discharge lamp, and
when the natural frequency is represented as f1, the driving frequency is represented as f2, and a half value width of a discharge lamp voltage of the discharge lamp at time when a value of the driving frequency is changed in a predetermined range centering on the natural frequency f1 is represented as Δf, the control section controls the discharge lamp driving section such that the driving frequency f2 satisfies any one of following Expressions 1 to 3:

$$f2 > f1 + \Delta f/2 \qquad \text{Expression 1}$$

$$(f1 + \Delta f/2)/2 < f2 < f1 - \Delta f/2 \qquad \text{Expression 2}$$

$$(f1 + \Delta f/2)/2(n+1) < f2 < (f1 - \Delta f/2)/2n \text{ ($n$ is a natural number).} \qquad \text{Expression 3}$$

2. The discharge lamp driving device according to claim 1, wherein a waveform of the driving current is a rectangular wave.

3. A projector comprising:
a discharge lamp configured to emit light;
the discharge lamp driving device according to claim 2;
a light modulation element configured to modulate light emitted from the discharge lamp according to a video signal; and
a projection optical system configured to project light modulated by the light modulation element.

4. The discharge lamp driving device according to claim 1, wherein the driving frequency is equal to or higher than 1 kHz.

5. A projector comprising:
a discharge lamp configured to emit light;
the discharge lamp driving device according to claim 4;
a light modulation element configured to modulate light emitted from the discharge lamp according to a video signal; and
a projection optical system configured to project light modulated by the light modulation element.

6. A projector comprising:
a discharge lamp configured to emit light;
the discharge lamp driving device according to claim 1;
a light modulation element configured to modulate light emitted from the discharge lamp according to a video signal; and
a projection optical system configured to project light modulated by the light modulation element.

7. A discharge lamp driving method for supplying a driving current, which is an alternating current, to a discharge lamp and driving the discharge lamp, the discharge lamp driving method comprising:
supplying the driving current having a driving frequency different from a natural frequency of the discharge lamp and a frequency of 1/2n (n is a natural number) times the natural frequency to the discharge lamp, and
when the natural frequency is represented as f1, the driving frequency is represented as f2, and a half value width of a discharge lamp voltage of the discharge lamp at time when a value of the driving frequency is changed in a predetermined range centering on the natural frequency f1 is represented as Δf,
setting the driving frequency f2 to satisfy any one of following Expressions 1 to 3:

$$f2 > f1 + \Delta f/2 \qquad \text{Expression 1}$$

$$(f1 + \Delta f/2)/2 < f2 < f1 - \Delta f/2 \qquad \text{Expression 2}$$

$$(f1 + \Delta f/2)/2(n+1) < f2 < (f1 - \Delta f/2)/2n \text{ ($n$ is a natural number).} \qquad \text{Expression 3}$$

* * * * *